United States Patent [19]

Wallace

[11] 4,297,122

[45] Oct. 27, 1981

[54] PROCESS FOR THE BIOLOGICAL DEGRADATION OF ORGANIC-CONTAINING WASTE MATTER

[75] Inventor: Christopher B. Wallace, Fitchburg, Mass.

[73] Assignee: Bio-Group, Inc., Va.

[21] Appl. No.: 31,332

[22] Filed: Apr. 18, 1979

[51] Int. Cl.³ .......................... C05F 7/00; C02F 3/02
[52] U.S. Cl. .......................................... 71/12; 71/15; 71/11; 71/14; 210/610; 210/620; 435/244
[58] Field of Search ...................... 210/17, 4, 14, 7, 15; 435/243, 244, 253; 71/8, 9, 11, 10, 12

[56] References Cited

U.S. PATENT DOCUMENTS

| | | | |
|---|---|---|---|
| 442,490 | 12/1890 | Moor | 71/12 |
| 1,029,378 | 6/1912 | Lawton | 71/9 |
| 1,260,103 | 3/1918 | Wallace et al. | 71/9 |
| 1,408,064 | 2/1922 | Balmer | 71/8 |
| 1,614,305 | 1/1927 | Johnson | 71/1 X |
| 1,617,014 | 2/1927 | Derleth | 71/9 X |
| 1,810,802 | 6/1931 | Travers et al. | 71/12 X |
| 1,938,647 | 12/1933 | Earp-Thomas | 71/10 |
| 2,241,734 | 5/1941 | Peterson | 71/9 |
| 2,797,985 | 7/1957 | Larson | 71/1 |
| 3,210,179 | 10/1965 | Davis et al. | 71/9 X |
| 3,235,369 | 2/1966 | Eweson | 71/9 |
| 3,410,233 | 11/1968 | Seiler | 71/12 X |
| 3,428,554 | 2/1969 | Dye | 210/4 |
| 3,442,637 | 5/1969 | Hudson et al. | 71/12 |
| 3,824,091 | 7/1974 | Holman | 71/12 |
| 3,855,120 | 12/1974 | Garbo | 210/17 X |
| 3,892,553 | 7/1975 | Goordman et al. | 71/14 X |
| 3,942,970 | 3/1976 | O'Donnell | 71/12 |
| 3,963,471 | 6/1976 | Hampton | 71/12 |
| 4,093,539 | 6/1978 | Guarino | 210/17 |
| 4,167,479 | 9/1979 | Besik | 210/17 X |

Primary Examiner—Michael S. Marcus
Attorney, Agent, or Firm—Pennie & Edmonds

[57] ABSTRACT

A biological degradation process for the treatment of organic containing waste-matter for producing a waste-matter sludge material, the process containing a step for contacting microorganisms with the organic-containing waste matter, which comprises adding to said step a microbial activity-enhancing concentration of a mineral composite consisting essentially of glacial deposit. Other mineral composites may also be used. The invention also relates to an improved waste-matter sludge material.

11 Claims, 1 Drawing Figure

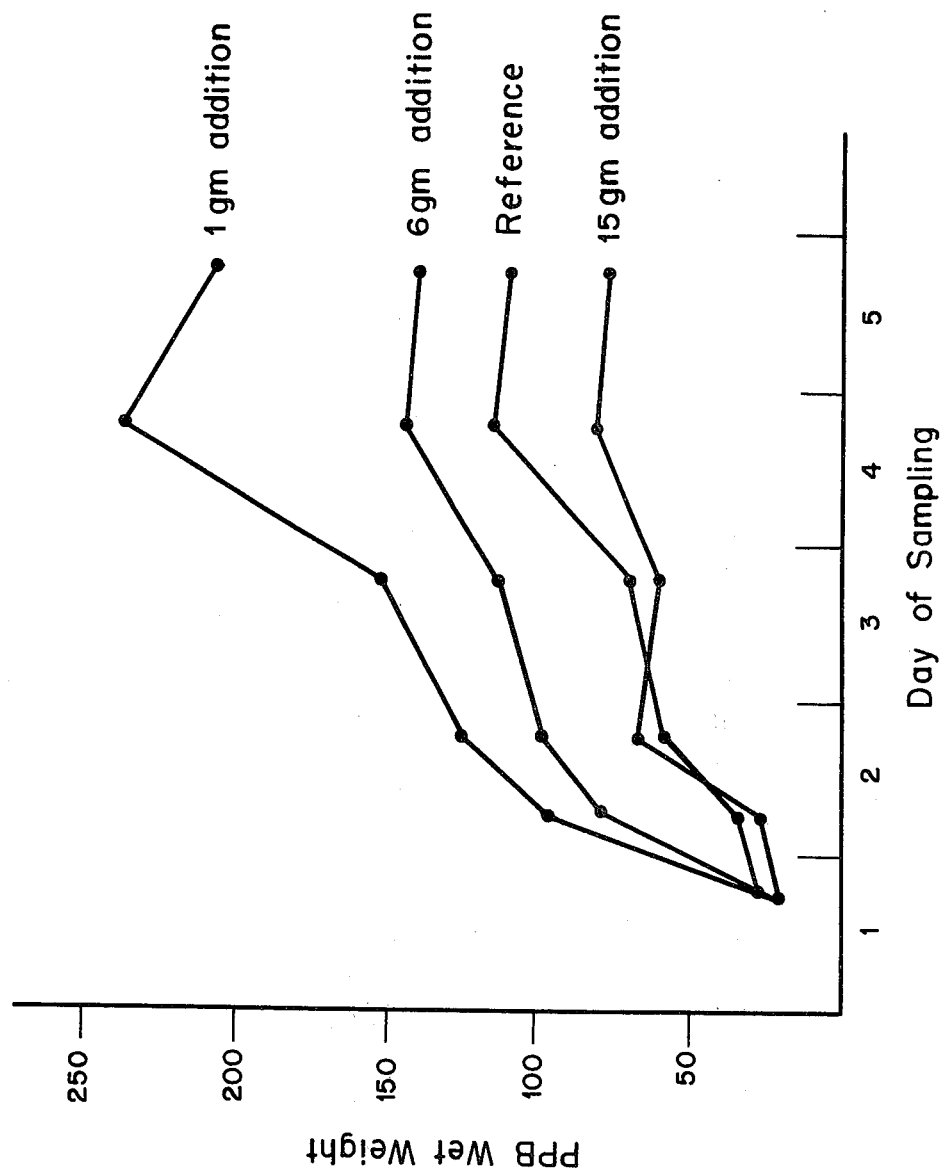

PROCESS FOR THE BIOLOGICAL DEGRADATION OF ORGANIC-CONTAINING WASTE MATTER

BACKGROUND OF THE INVENTION

1. Field of the Invention

One of the basic pollution problems that concern us today is that of sewage and solid waste disposal and treatment, as well as the management of the organic by-products derived therefrom. It has been determined through extensive research that the biological treatment of organic-containing municipal, domestic and industrial waste materials, including also agricultural wastes, animal wastes and other organic debris, offers the best practicable approach to dealing with these problems. In general, conventional biological processing systems for the treatment of organic-containing waste materials rely upon microorganisms to absorb and metabolize the organic components of the incoming wastes. The microorganisms are typically introduced into such systems and contacted with the influent by means of return or "re-cycled" sludge, which contains these microorganisms although the microorganisms may also be introduced otherwise or may even be allowed to grow and reproduce naturally. The functional portion of all biological systems is directly related to the number and physiological state of the microorganisms which are present within the system.

Accordingly, of the various methods for the treatment of sewage and other organic-containing waste matter currently known or contemplated as technically and ecologically feasible, the one thing that all such treatment methods have in common is a biological treatment or biodegradation step employing the use of bacteria which simulate the biological degradation process which normally takes place in nature. It is the purpose of such a biological treatment or biodegradation step to convert the organic matter contained in the influent waste matter so as to yield a new stabilized bacterial biomass matter which is commonly known as sludge (although most typically, a "sludge" refers to the biomass resulting from the treatment of human waste, while "humus" is used to identify the resulting product of agricultural wastes). Thus, while the various known biological treatment processes may differ in the extent to which the organic-containing waste matter is pre-treated, i.e., in order to remove solid matter, grit matter, suspended solids and the application of other so-called primary-treatment methods, or the extent and conditions under which the biological or biodegradation treatment takes place, i.e., the so-called secondary-treatment methods, whether activated sludge is used or not, or the extent and conditions under which the resulting effluent is further treated or improved, i.e., by chemical addition and other so-called tertiary treatment steps, or the extent and conditions under which the resulting sludge is further treated or improved, all such processes rely upon the biological action of bacterial microorganisms upon the organics contained in influent matter. As noted, such biological action may itself vary in respect to the condition under which the biological action is allowed to take place, for instance, whether under aerobic conditions, or anaerobic conditions, or facultative processing, each condition favoring specific forms of bacterial microorganisms, with the aerobic processes depending upon the presence of aerobic bacterial which require free oxygen for their metabolism while anaerobic processes foster bacteria which do not require free oxygen, but instead, derive their oxygen from the availability and presence of substance such as sulfates, phosphates and various organic compounds.

A yet further area in which biological action is relied upon is in the composting of solid organic-containing waste matter wherein the organic waste matter is biologically acted upon by bacterial microorganisms so as to likewise decompose and convert the organic matter in order to yield a stabilized sludge or humus material. As in the case for the biological treatment of liquid sewage and other organic-containing waste matter, the biological action in composting processes may also be carried out under aerobic or anaerobic conditions.

Another feature that all methods for the treatment of organic-containing waste material by means of a biological treatment or degradation step have in common is a requirement that the biological process be carried out to such an extent and for a length of time sufficient to "destroy" or "neutralize" the deleterious organic matter contained in the waste material and especially the harmful, i.e. pathogenic microorganisms such as bacteria, viruses and protozoa, as well as to reduce the odor, the volatile organics, etc., so as to thereby yield a relatively benign bacterial-containing matter product commonly referred to as sludge. It should be noted, however, that activated sludge processing for the production of fertilizer generally does not allow for complete digestion and stabilization of organic material. To this end, it is readily apparent that the biological treatment step of any conventional waste treatment system must be so designed so as to ensure that the biological degradation process is allowed to progress for a sufficient time before such action is caused to be terminated. While various methods have been suggested for "speeding-up" or "intensifying" the natural biological action, most such methods rely upon some sort of a chemical additive and none of such methods have proven satisfactory. The relatively long residence time necessary in order to achieve the desired bacterial degradation and the desired resulting sludge material remains today one of the major features of all biological waste treatment systems which makes these systems uneconomical.

Closely associated with the ecological problems relating to the treatment of liquid and solid organic-containing waste matter by means of biological action to produce a sludge is the further problem of what is to be done with the vast amounts of sludge produced by these various processes. Today, several alternative sludge management practices are contemplated including but not limited to ocean disposal—no longer viable because of ever-increasing regulatory limitations—incineration, landfill, fertilizer and soil reclamation applications; "Municipal Sludge Management: Environmental Factors", Publication MCD-28, October 1977; "Sludge Handling and Disposal Practices At Selected Municipal Wastewater Treatment Plants", EPA Publication MCD-36, April 1977. Of all of the foregoing, fertilizer and soil reclamation applications for sewage and other waste matter sludge has been of greatest interest. However, due to the relatively low nutrient value of traditional sewage sludge—low as compared to commercial fertilizers and other soil additives, particularly in respect to the total nitrogen, phosphorous and potassium content—such fertilizer and soil reclamation applications have not gained wide acceptance. For instance, sludges typically contain only from 1–6% total nitrogen by weight and only from 1-3% by weight, phosphorous, "Application of Sewage Sludge to Croplant", EPA No. 430/9-76-013, Publication MCD-33, Nov. 1976, at pages 16 and 18, and more typically about 3% nitrogen, 2.5% phosphorous and 0.3% potassium, "Municipal Sludge Management: EPA Construction Grants Program", EPA Publication MCD-30, April 1976, at page 9. This has severly limited the feasibility of using sludges for fertilizer and soil applications.

As such, it can be seen that all conventional organic-containing waste treatment processes employing a biological treatment or degradation step have at least two disadvantageous features in common, viz, a relatively long requisite period during which the biological action must be allowed to take place and a relatively low nutrient value for the resulting sludge product. It is primarily in respect to these disadvantageous features of the state of the art that the present invention is directed, although further significant beneficial features of the instant invention, as discussed herein, also will be realized.

As noted above, the microorganisms which are required to initiate biological degradation are typically supplied to the waste system's biological treatment step by return or "recycled" sludge which contains these microorganisms. This sludge may or may not also represent the product resulting from the biological treatment step of the waste treatment process and, as noted, it may or may not be further processed or treated prior to its removal from the waste treatment system. The effectiveness of the sludge, whether for its action upon influent raw organic-containing waste matter in supplying the initial number of microorganisms, or for its fertilizing and/or soil additive properties owing to its inherent nutrient value, is directly related to the number and physiological state of the "living cells" that are present in the sludge and which absorb and metabolize the organic components of the influent waste matter. These living cells are the functional portion not only of the sludge but also of the entire waste treatment process. It is now generally accepted that because the chemical "adenosine triphosphate" (ATP) is universally present in all living microorganisms, that its measurement will yield a fast and an accurate indication of the relative effectiveness of the sludge. Measurement of the ATP value of sludge is also known as "biomass" determination and is more fully discussed is "Biomass Determination—A New Technique For Activate Sludge Control", Water Pollution Control Research Series, PB 211 127, Jan. 1972.

2. Description of the Prior Art

Various additives to the biological treatment step, to the raw waste material, and/or to the resulting sludge have been proposed so as to enhance the properties of the sludge. Thus, for instance, Goordman et al U.S. Pat. No. 3,892,553 discloses the addition of mine tailings to waste matter to produce a synthetic top soil. The minerals involved are not specific in their analysis and are used for their physcial properties in the formation of a soil matrix. The minerals recommended for use are "spent" by-products of the mineral processing industry and possess a relatively very low nutrient value. The end product is a high mineral to organics ratio soil. This patent also refers to sewage as an alternative additive ingredient in the recited invention; however, sewage sludge is an end product of conventional biological waste treatment processing and is an area with which the patent is not concerned.

Lawton U.S. Pat. No. 1,029,378 concerns itself with rendering minerals available through long term aerobic fermentation, and generally attempts to improve upon processes used by commercial chemical firms for isolating fertilizer elements. The Lawton patent does not apply the invention to biological processing of sewage influent by current biological processing nor does the patent use a specific mineral analysis and the disclosure of this patent does not provide for microbial stimulation over and above the natural processing rate.

Eweson U.S. Pat. No. 3,235,369 deals with the production of a granulated fertilizer and the patent does not specify any particular mineral analysis. The primary objective of this patent is to simplify product handling and physical disposal. The silica minerals of the patent, preferably ground glass, are used for the purpose of granulating agents and are not disclosed as capable of stimulating microbial populations significantly over natural processing. This patent does mention various minerals as food sources for microbes but only for their adhering qualitites and not as a broad based microbial stimulant. Generally, the process of the patent is dependent on the natural intensity of microbial activity and does not at all deal with intensifying natural microbial activity.

Wallace et al U.S. Pat. No. 1,260,103 concerns itself with adding organic and inorganic materials to garbage and refuse for the sole purpose of absorbing liquid and "toxic" by-products of microbial development. The patent does not mention that the mineral addition increases the microbial population significantly over the natural course of processing.

Earp-Thomas U.S. Pat. No. 1,938,647 describes a process wherein bacterial strains and culture mediums are added to organic wastes and composted. The patent does not claim a broad based biological increase but rather attempts to introduce a specific bacteria that is already naturally indiginous to the process in the hopes that it will predominate. The minerals and fertilizing elements that the patent adds are at the end of the digestion process and are a secondary supplement prior to fertilizer distribution.

SUMMARY OF THE INVENTION

The present invention is directed to a biological degradation process for the treatment of organic containing waste-matter for producing a waste-matter sludge material, the process containing a step for contacting microorganisms with the organic-containing waste-matter, which comprises adding to said step a microbial activity-enhancing concentration of a mineral composite consisting essentially of a glacial deposit. Other mineral composite may also be used. The invention also relates to an improved waste-matter sludge material.

DESCRIPTION OF THE PREFERRED EMBODIMENTS

It has been discovered that it is possible to significantly increase the biological activity of the bacterial microorganisms employed for the biological degradation of organic-containing waste matter by the use of a mineral composite consisting essentially of naturally occuring glacial deposit. Glacial deposits are naturally occuring rock formations which have been found to uniquely contain the combination of elements which yield the beneficial results described herein.

It is known that minerals are comprised of elements and that rocks are comprised of minerals; it is difficult to find any pure elements or minerals in nature since they are usually found in combination with other elements and minerals. The elements that make up the bulk of the minerals found in igneous rocks, for instance, in the order of magnitude in which they appear are as follows: O, Si, Al, Fe, Ca, Na, K, Mg, and constitute approximately 95% of the bulk. The remaining elements found in nature constitute the last 5%. This is the average abundance of these elements. Some of the major rock types contain the less frequent minerals as major constituents. Igneous rocks, being a mixture of minerals, represent an almost infinite variety of composition and it is difficult to find any two of the same rock species with an identical chemical analyses.

Glacial deposits, also known as moraines, eskers, kanes, till drift, drumlins, outwashes, etc., are by their nature mixtures of many different rocks and minerals. These rocks and minerals have usually been transported for some distance by the glacial ice and/or the waters of melting glacial ice. Glacial deposits are unique in that they contain rocks and minerals, in sizes ranging from silt to boulders, comprised of a combination of sources and rock species. They can contain particles of granite, shale, gneiss, basalt, diorite, limestone, femic rocks, etc.. They can also contain minerals of quartz, feldspar, horneolend, orthoclase, albite, olivine, hemitite, titanite, magnetite, calcite, apatite, biotite, and others. High silica and low silica material can be found in proportions that would be restrictive in a single rock mass. "The Data of Geochemistry", Frank Wiggleswirth Clark, Geological Survey Bulletin No. 770, 5th Ed., Dept. of Inter., 1959. See also Van Nostrand's Scientific Encyclopedia (5th Ed., 1976), "Glacial Deposits (or Drifts)" at page 1182.

Glacial deposits are used in the present invention because they have been found to contain rocks and minerals in combinations not normally found in other rock masses. However, the neutral rocks, rocks with a silica content of about 45–55%, are capable of containing the largest mineral combination to be found in a rock species. It would be possible to take a neutral rock like basalt and combine it with a calcite or limestone and achieve a mix that could compare, by chemical analysis, with a glacial deposit. Glacial deposits is therefore used for convenience of mix and not as a limiting factor.

Minerals such as quartz, olivine, orthoclase, biotite, calcite, graphite, etc., when added individually to organic-containing waste matter, do not cause a broad based biological increase over that of a control sample (assuming a neutral or near neutral pH of the organic material). It has also been discovered that it is undesireable to use minerals, either singly or in aggregate form, with a silica content ($SiO_2$) of about 60% and greater, a CaO content, including $CaCO_3$, of about 70% and greater, and $Al_2O_3$ content of about 25% and greater, and a content exceeding about 20% of any single constituent other than $SiO_2$, CaO and $Al_2O_3$.

Glacial deposits, being made up of igneous, metamorphic, and sedimentary rocks, vary in composition as do the originating rock sources and should generally be tested for chemical composition to determine their suitability for use within the content of the present invention.

While applicant does not wish to be bound by any particular theory, it is believed that the combination of mineral elements uniquely present in glacial deposits coact in a "catalytic" manner to stimulate the microorganisms to increase their activity and to increase their population in the degradation process. It is also believed possible that the mineral composite possesses just the correct balance of the nutrient values which are utilized by the viable biomass as a readily available stimulatory food source so that by giving the biomass such an unrestricted (due to the small particle size of mineral composite) secondary food source—the organics of the waste being the primary good source—one is able to substantially increase their numbers.

It will be understood that while the absolute amounts of the elements present in glacial deposits may vary amongst various deposits, that all such glacial deposits are generally unique in containing the combination of elements found necessary to obtain the results of the present invention. These mineral deposits have been found to contain just the right mixture of the requisite elements.

For purposes of the present invention, a naturally occuring glacial deposit is one wherein at least the following elements are present in the amounts indicated below in Table 1—the amounts found typical in such deposits are also shown in Table 1:

TABLE 1

| Element | Range (Wt. Percent) | Typical (Wt. Percent) |
|---|---|---|
| Si | about 4–48 | about 27.7 |
| Ca | about 2–35 | about 28 |
| Al | about 1–20 | about 8.1 |
| Fe | about 1–15 | about 5 |
| Mg | about 0.5–12 | about 2.1 |
| Na | about 0.1–8 | about 2.8 |
| K | about 0.01–5 | about 2.5 |
| Ti | about 0.001–2 | about 0.44 |
| Mn | about 0.0005–2 | about 0.1 |
| P | about 0.0005–2 | about 0.1 |
| Ba | about 0.0005–1 | about 0.01 |
| Zn | about 0.0005–.5 | about 0.01 |

In addition, the following elements may be also present: F, below about 0.8 wt. percent and typically about 0.07 wt. percent; S, below about 0.8 wt. percent and typically about 0.05 wt. percent; Rb, below about 0.8 wt. percent and typically about 0.035; V, below about 0.5 wt. percent and typically about 0.015 wt. percent; Cl, below about 0.1 wt. percent and typically about 0.04 wt. percent; Cr, below about 0.1 wt. percent and typically about 0.002 wt. percent; Zr, below about 0.1 wt. percent and typically about 0.0018 wt. percent; Cu, below about 0.01 wt. percent and typically about 0.0005 wt. percent; Pb, below about 0.01 wt. percent and typically about 0.00015 wt. percent; Co, below about 0.01 wt. percent and typically about 0.0002 wt. percent; Ni, below about 0.01 wt. percent and typically about 0.0008 wt. percent; Li, below about 0.01 wt. percent and typically about 0.0002 wt. percent; Sc, below about 0.01 wt. percent and typically about 0.0002 wt. percent. The following elements may also be present in amounts below about 0.001 wt. percent and most usually only in trace amounts (below about 0.0005 wt. percent): Mo, Ga, Ge, As, Se, Br, Y, Nb, Ru, Rh, Pd, Ag, Cd, In, Sn, Sb, Te, I, Cs, La, Ce, Pr, Nd, Sm, Eu, Gd, Td, Dy, Ho, Er, Tm, Yb, Lu, Hf, Ta, W, Re, Os, Ir, Pt, Au, Hg, Tl, Bi, Th. Trace amounts (below about 0.0005 wt. percent) of the following may also be present: U, Kr, Xe, Pm, Po, At, Rn, Fr, Ra, Ac, Pa, Np, Pn, Am, Cm, Bk, Cf, Tc, Es, Fm, Md. Oxygen, representing from about 10–70 wt. percent, constitutes the remainder of the mineral deposit—the elements are typically found in the oxide form. It should be noted that all trace elements may not be detectable or in fact present on an individual basis in any given deposit although many of the elements are detectable by mass spectographic analyses; the remaining elements may be present by not detectable by this method.

The results of mass spectograph analysis for a glacial deposit samples are set forth in Table 2. The oxide compound analysis of the major components (two analysis made for each sample) of three glacial deposit samples are set forth in Table 3.

While the practice of the present invention is most economically carried out by the use of a mineral composite consisting essentially of a naturally occuring glacial deposit as defined above, and particularly in Table 1, it is also possible to obtain the beneficial results by synthetically combining at least those elements which are identified in above—Table 1 in the amounts shown therein.

The use of the mineral composites of the present invention in a biological degradation process for the treatment of organic-containing waste matter has been found to substantially enhance the natural biological activity of the microorganisms as compared to the natural processing rate of biological action. As such, and as previously noted, the mineral composite acts as in a catalytic manner in microbial stimulation and in substantially increasing the microbial population and also in the hastening of the biological degradation of the organic component of the infulent waste matter.

Moreover, it has been found that not only does the mineral composite substantially hasten the biological action involved in the formation of the resulting waste-product sludge, which of course has the commercially economical effect of requiring a shorter residence time to achieve a given degree of biological degradation, and, hence, permits a faster throughput of organic-containing waster matter—but it has also been found that the waste-matter sludge material which results from the use of the instant mineral composite, and especially in the case of aerobic processes, possesses substantially enhanced nutrient values of immobilized carbon, nitrogen, potassium and phosphorous as well as the immobilized nutrient values of sulfur, magnesium, calcium and sodium. Enhancement of about 100% and above in the immobilized values of the foregoing nutrient elements have been realized by the practice of the present invention as compared to a sludge obtained without application of the present invention to the waste-matter (see, for instance, Tables 4 and 6). The foregoing enhanced values makes the sludge product especially suitable as a fertilizing and/or as a soil additive material.

While the mineral composite of the present invention itself possesses nutrient values, and to the extent that the composite is not consumed in whole or in part in the biological degradation process it would appear in the resulting sludge and may contribute to the nutrient values directly, it should be understood that any observed increase in nutrient value in the resulting waste-matter sludge material over sludge produced without the mineral composite is due to the enhanced microbial population and not to the mere presence of the mineral composite in the resulting sludge. That is, improvements in the resulting sludge are not due solely to the absorption, granulation or "melting" of minerals into the end product.

It has also been found that in order to achieve adequate enhanced biological activity it is first necessary to reduce the particle size of the mineral composite, and it is desired to reduce the particle size of the mineral composite to below about 70% of mesh size at 100 mesh and preferable to below 70% of mesh size at about 200 mesh (10 microns). Any conventional means for reducing the particle size may be employed such as a ball mill, hammer mill, rotary mill, and the like.

The amount of mineral composite that is to be employed in the biological degradation process will depend upon the total amount of organics in the influent organic-containing waste-matter. It is a surprising aspect of the present invention that excessive addition of the mineral composite will actually have little or no effect on enhancing biological activity and may even have a negative effect in decreasing such activity, as compared to the naturally occuring degradation process where no mineral composite is added. It has been observed that even a very small amount of mineral composite will bring about the desired biological activation results. To achieve the desired degradation of the organic matter to the resulting stabilized sludge material, the amount of mineral composite should be below about 1 part by weight per 15 parts by weight organic matter contained in the influent waste matter that is to be treated and above about 1 part by weight mineral composite per 400 parts by weight of organics; preferably the amount may be below about 1 part by weight of mineral composite per 40 parts by weight of organics and yet more preferably about 1 part by weight of mineral composite per 120 parts by weight of organics. About 1 part by weight mineral composite per 300 parts organics has also been found uniquely advantageous. The exact amount can easily be determined. By the use of the foregoing amounts, degradation of up to about 99% and above of the organics in the influent is realized.

It will be understood that "biological degradation" in the content of the present invention generally refers to the phenomena pursuant to which organic-containing matter, from whatever source as herein discussed, is converted to a sludge material which is relatively stabilized and reduced in odor, pathogenic microorganisms and volatile organics. It will also be understood that "mineral composite" as used in the contest of the present invention refers specifically to the naturally occuring glacial deposit as here defined and/or to the synthetic combination of elements as here also defined. It will be further understood that a "waste-matter sludge material" in the context of the present invention refers to the resulting product of the biological degradation process, and particularly the solid components thereof whether dried or not, and it also denotes what is customarily referred to as secondary sludge, stabilized sludge and the like.

The temperature under which the biological degradation process may take place is not critical and it has been found that the microbial-enhancing activity of the mineral composite is in no way adversely affected by the temperatures typically employed in commercial waste treatment systems, including the relatively high temperatures encountered in composting processes as well as the temperature normally employed in mesophilic and thermophilic digestion. Likewise, the total time for the degradation process is not critical, although as an indication of the effectiveness of the present invention, it is possible to achieve the desired conversion of the organics to sludge in as little as about 6 hours to a maximum of about 5 weeks, depending on the process used.

The mineral composite may be admixed directly with the organic-containing waste influent prior to the biological treatment step of the process or, for instance, in application in commercial waste treatment systems the mineral composite may be added to the activated sludge which is returned for contact with the influent organic-containing waste material. Thus, the mineral composite may be added essentially at any stage of a treatment system, the only requirement being that it eventually contact the organic-containing waste material to be treated. See, for instance, "Municipal Sewage Treatment—A Comparison Of Alternatives", Feb. 1974, Council On Environmental Quality, Contract EQC 316, which describes various waste treatment systems and from which it will be readily apparent the various places in the system where the mineral composite may be added. Without limitation, the mineral composite may be added to primary, secondary and/or tertiary treatment systems, waste stabilization lagoons, to trickling filter systems, to activated sludge to yet further "activate" it, to extended aeration systems, to composting systems, and to other like natural and high-rate digestive systems.

The mineral composite of the instant invention has also been found to be equally suitable for application in aerobic processes, anaerobic process, whether practiced in the treatment of liquid or solid (including composting) waste treatment systems. It has also been found suitable in waste treatment processes wherein the aqueous content of the organic-containing waste matter is relatively very high, up to about 99% by weight. Application in composting processes, with or without the production of a methane by-product, is also completely viable; see "Composting Of Municipal Solid Waste In The United States", Publication SW-47r, U.S. Environmental Agency, 1971, wherefrom the precise application of this invention in composting processes will be apparent.

It has been found that the present invention yields ATP biomass values which are relatively substantially higher and conclusively establishes that the use of the mineral composite described here increases both microbial populations and microbial activity as well as substantially increasing the digestion rate. As such, it will be understood that enhanced microbial activity in the context of this invention refers to the phenomena by which the numbers and activity of the microorganisms are substantially increased and by which the systems total biomass, as measured by ATP measurements, is substantially increased (see, for instance, Table 5 and FIG. 1).

Similarly realized by the application of this invention are significant improvements and enhancement in the total immobilized values of carbon, nitrogen, potassium, phosphorous, sulfur, magnesium, calcium and sodium of the sludge, i.e., approaching on the order of about 100% (see, for instance, Tables 6 and 7), as well as substantial reduction in dissolved organic carbon (DOC) of the influent, i.e., approaching about 50% (see, for instance, Table 8), and a reduction in the percent of volatile solids, i.e., of from about 16% up to about 23% in extended aeration systems (see, for instance, Table 9).

An added benefit of the present invention is the achievement of decreased problems concerning "shock loading". Municipal treatment systems experience hydraulic "shock loading" when rain water and snow melting place more water into the system than is normal. This causes the biological action to be diluted and the resulting efficiency drops. However, when the biological action is increased according to the practice of this invention, the "shock load" is counteracted with more cells and the desired degree of biological treatment is maintained.

Other advantages which would be readily apparent to the skilled artisan are also achieved in the practice of the instant invention.

It should be noted, however, that excessive chemical treatment of the effluent of a waste treatment system, i.e., by addition of ferric chloride, large lime doses, alum, etc., where such chemicals or effluent may subsequently contact the mineral composite prior to or during the degradation step, has an inhibiting effect upon this invention and should be avoided.

TABLE 2

ELEMENTAL COMPOSITION OF GLACIAL DEPOSIT MINERAL COMPOSITE BY MASS SPECTROGRAPHIC ANALYSIS (UNITS ARE PARTS PER MILLION (PPM) DRY WEIGHT)

| ELEMENT | CONCENTRATION | ELEMENT | CONCENTRATION |
|---|---|---|---|
| Li | 70 | Ag | 7 |
| Be | 0.15 | Cd | 1 |
| B | 10 | In | 0.1 |
| F | 15 | Sn | 20 |
| Na | 4000 | Sb | 4 |
| Mg | 5% | Te | 0.4 |
| Al | 4% | I | 0.2 |
| Si | 10% | Cs | 2 |
| P | 200 | Ba | 150 |
| S | 600 | La | 5 |
| Cl | 70 | Ce | 15 |
| K | ~3000 | Pr | 1.5 |
| Ca | 7% | Nd | 7 |
| Sc | 7 | Sm | 3 |
| Ti | 1500 | Eu | 0.5 |
| V | 30 | Gd | 1 |
| Cr | 10 | Tb | 0.15 |
| Mn | 600 | Dy | 1 |
| Fe | 3% | Ho | 0.2 |
| Co | 40 | Er | 0.6 |
| Ni | 15 | Tm | <0.15 |
| Cu | 30 | Yb | 0.6 |
| Zn | 20 | Lu | <0.15 |
| Ga | 10 | Hf | 1 |
| Ge | 2 | Ta | <0.15 |
| As | 5 | W | <0.4 |
| Se | 3 | Re | <0.2 |
| Br | 0.5 | Os | <0.4 |
| Rb | 150 | Ir | <0.2 |
| Sr | 150 | Pt | <0.4 |
| Y | 10 | Au | <0.15 |
| Zr | 60 | Hg | <0.4 |
| Nb | 1.5 | Tl | 0.2 |
| Mo | 3 | Pb | 15 |
| Ru | <0.4 | Bi | 0.3 |
| Rh | <0.1 | Th | 0.4 |
| Pd | <1 | U | 1 |

TABLE 3

COMPOUND COMPOSITION OF THREE GLACIAL DEPOSIT MINERAL COMPOSITES BY A SPECTOGRAPHIC ANALYSIS (UNITS ARE PARTS PER MILLION (PPM) BY WEIGHT)

| | Mineral Composite | | | | | |
|---|---|---|---|---|---|---|
| | 1 | | 2 | | 3 | |
| Compound | A | B | A | B | A | B |
| $Fe_2O_3$ | 16,000 | 15,000 | 17,000 | 15,000 | 25,000 | 23,000 |
| MgO | 78,000 | 65,000 | 69,000 | 63,000 | 42,000 | 45,000 |
| $Al_2O_3$ | 15,000 | 20,000 | 14,000 | 17,000 | 24,000 | 41,000 |
| $SiO_2$ | 135,000 | 132,000 | 121,000 | 108,000 | 285,000 | 273,000 |
| $Cr_2O_3$ | 30 | 60 | 30 | 40 | 50 | 30 |
| NiO | 10 | 10 | 8 | 7 | 10 | 6 |
| $V_2O_5$ | 10 | 10 | 20 | 40 | 30 | 30 |
| CuO | 80 | 200 | 100 | 100 | 200 | 90 |
| ZrO | 2 | 1 | 2 | 3 | 4 | 1 |
| BaO | 10 | 7 | 10 | 10 | 20 | 8 |

TABLE 3-continued
COMPOUND COMPOSITION OF
THREE GLACIAL DEPOSIT MINERAL
COMPOSITES BY A SPECTOGRAPHIC ANALYSIS
(UNITS ARE PARTS PER MILLION (PPM) BY WEIGHT)

| | Mineral Composite | | | | | |
|---|---|---|---|---|---|---|
| | 1 | | 2 | | 3 | |
| Compound | A | B | A | B | A | B |
| $MnO_2$ | 400 | 500 | 500 | 400 | 600 | 500 |
| $TiO_2$ | 1,400 | 1,500 | 1,300 | 1,400 | 2,900 | 3,100 |
| $SiO_2$ | 50 | 40 | 40 | 50 | 60 | 60 |
| $P_2O_5$ | 900 | 800 | 1,100 | 1,200 | 1,000 | 1,000 |
| $B_2O_3$ | 2 | 4 | 3 | 5 | 4 | 4 |
| PbO* | 100 | 10 | 300 | 200 | 300 | 200 |
| BiO* | <10 | <10 | <10 | <10 | <10 | <10 |
| $Li_2O$ | 4 | 4 | 2 | 2 | 1 | 2 |
| $MoO_2$ | 3 | 5 | 6 | 10 | 80 | 40 |
| ZnO** | <50 | <50 | <50 | <50 | <50 | <50 |
| CoO | 10 | 10 | 90 | 20 | 20 | 20 |
| $Rb_2O$ | 2 | 1 | 2 | 1 | 3 | 3 |
| GeO | 4 | 10 | 5 | 8 | 6 | 9 |
| $Na_2O$ | 5,800 | 6,800 | 6,200 | 6,900 | 9,500 | 10,000 |
| $K_2O$ | 6,200 | 6,900 | 5,800 | 5,200 | 6,500 | 5,500 |
| CaO* | Remainder | | Remainder | | Remainder | |

*Includes $CaCO_3$.
**Detection limits as low as 1 ppm.

EXAMPLE 1

A. EXPERIMENTAL PROCEDURE

A glacial deposit mineral composite conforming to that identified in Table 2 was ground to the specification of 70% of mesh size at 200 mesh. Fresh primary sludge (a raw organic-containing influent waste matter) was removed from a special holding tank associated with the primary settling tanks of an operating domestic sewage treatment plant. Secondary sludge was obtained from the slip tubes returning activated sewage from the secondary settling tank to the aeration tank in the same treatment plant. Sewage from each location was placed in separate, plastic-lined 5-gallon containers and transported to a cold storage room. Every precaution was taken to obtain and maintain fresh sewage.

Thereafter, 12 experimental units were prepared as follows: representative samples from the appropriate 5-gallon containers, about 2700 ml of primary sludge, and containing about 120 gms of organics, and 800 ml of secondary sludge were mixed in 1 gallon (3.78 liter) containers. Subsequently, 1, 6 and 15 gm additions of the mineral composite were placed in each of three containers, respectively. The 1 gm addition corresponds to about 1 part mineral composite per 120 parts organics to be treated to achieve about 95% degradation. Likewise, the 6 gm addition corresponds to about 1 part mineral composite per 1 part of organics and the 15 gm addition corresponds to about 1 part mineral composite per 8 part of organics. Three reference units were set up, too. Each unit was stirred vigorously to assure proper mixing. Air was supplied to each container by two Silent-Giant pumps. Previous experience with the pumps and container size had shown that the above combination would maintain adequate oxygen levels. The 12 experimental containers were placed in an environmental chamber where the photoperiod was 12:12 (12 hours of light, 12 hours of dark) at a temperature of 24° C., simulating local summer conditions.

Prior to taking any samples (for microbiological, chemical, and physical characterization), each unit was stirred vigorously to assure as homogeneous and representative a sample as possible. During the entire experiment, the containers were examined frequently. Any adjustments were made immediately. For example, some solids collected on the neck of the jar and these were frequently pushed back into the unit. Also, some make-up water (distilled) was added daily.

1. Measured Microbiological Characterizations

Adenosine triphosphate (ATP) Analysis was carried out as follows: One-gram aliquots were taken on Days 1, 2 (a.m. and p.m.), 3, 4, and 5. Three milliliters (ml) of TRIS (0.02 M with EDTA) were added to each aliquot. After sonification for about 30 sec, 2 ml of chloroform were added. Sonification was run for another 30 sec. The material was centrifuged at about 2500 rpm for 10 min. Four ml of liquid were then decanted and 2 ml of $CCl_4$ were added. After centrifugation for another 5 min, the top 2 ml of solution (buffer) were removed and stored in a refrigerator. Assays were performed using luciferinluciferase reaction in a liquid scintillation counter.

Total Microbial Nutrient Immobilization Analysis was carried out as follows: Total microbial carbon, nitrogen, phosporus, potassium, calcium, magnesium, sulfur, and sodium were computed from the ATP results using the following relationship (Table 4). Calculations for sludge were based on the microbial community being 75% bacterial.

In addition, coliform and total plate counts were monitored although such measurements are, of their nature, less precise than ATP analysis.

TABLE 4
THE RELATIONSHIP BETWEEN BACTERIAL
AND FUNGAL (INCLUDING ACTINOMYCETE)
ATP CONCENTRATION AND EIGHT ELEMENTS
(CARBON, NITROGEN, PHOSPHOROUS, SULFUR,
POTASSIUM, MAGNESIUM, CALCIUM, SODIUM)
(The proportionalities remain constant (within error limits) throughout all life phases).[a]

| Microbial Group | Number of Atoms of Nutrient Element per Molecule of ATP | | | | | | | |
|---|---|---|---|---|---|---|---|---|
| | ATP | C | N | P | K | A | Mg | Ca | Na |
| Bacteria | 1 | 500 | 40 | 9 | 15 | 2 | 1.5 | 9.5 | 0.2 |
| Fungi[b] | 1 | 205 | 13 | 2 | 8 | 2 | 0.9 | 7.9 | 0.2 |

[a] Ausmus and Witkamp, 1973.
[b] Includes actinomycetes.

2. Measured Chemical Characterizations

Dissolved Organic Carbon (DOC) Analysis were carried out as follows: Uniform ml samples for total organic carbon were taken on Days 1, 2 (a.m. and p.m.), and 3. First, one-tenth (0.1) ml of sewage was placed in flasks containing 100 ml of distilled water (1:1000 dilution). Secondly, a 0.1 ml sample of sewage was placed in a flask containing 10 ml distilled water (1:100 dilution). Analysis was performed immediately using a Technician auto analyzer. Peaks were converted to ppm units.

The following chemical parameters were also monitored: phosphate analysis, nitrate analysis and elemental content.

3. Measured Physical Characterizations

Percent Volatile Solids Analysis was carried out as follows: twelve 40 ml plug samples were taken on Days 1 and 5. These samples were centrifuged at about 2500 rpm for about 15 minutes. The samples were then oven dried at 105° C. for 48 hours and then weighed. The oven dried and weighed plugs were then placed in a muffle furnace at 350° C. for 3 hours. The weight difference between oven and muffle-dried plugs was expressed as percent volatile solids.

The following physical characteristics were also monitored: percent moisture, settleability, odor, texture, particle size and color.

B. RESULTS

Adenosine triphosphate (ATP) Analysis: Results of ATP analysis show that the 1 and 6 gm additions of the mineral composite increases ATP content in the sewage experiments relative to references. Mean values for all four conditions are provided in Table 5, FIG. 1 presents a more visual portrayal of the results. At Day 1, ATP content was between 21 and 27 ppb. By Day 2 (a.m. and p.m.), the 1 gm and 6 gm additions were displaying about two times the ATP of the reference. This trend continued with the 1 gm and 6 gm addition reaching a peak on Day 4 at about 230 ppb relative to about 120 for the reference. In summary, ATP levels were significantly higher in the 1 gm and 6 gm additions than in the reference.

TABLE 5

TRENDS IN ATP ANALYSIS DATA (Units are parts per billion (ppb) wet weight of solids).

| Treatment | 1 | 2 A.M. | 2 P.M. | 3 | 4 | 5 |
|---|---|---|---|---|---|---|
| Reference | 27 | 31 | 58 | 61 | 114 | 105 |
| 1 gm addition | 21 | 95 | 124 | 152 | 233 | 205 |
| 6 gm addition | 21 | 83 | 100 | 113 | 143 | 135 |
| 15 gm addition | 22 | 26 | 68 | 59 | 77 | 75 |

Total Microbial Carbon and Immobilization of Eight Elements: Using ATP to elemental ratios (Table 4) the immobilized C, N, P, (primary nutrients) and K, S, Mg, Ca and Na (secondary nutrients) were estimated (Table 6). Total immobilized carbon for the experimental units were also calculated from the ratios and total sludge volumes (Table 7).

TABLE 6

IMMOBILIZED CARBON, NITROGEN, POTASSIUM, PHOSPHORUS, SULPHUR, MAGNESIUM, CALCIUM AND SODIUM IN MICROBIAL TISSUES AMONG TREATMENTS THROUGH THE FIVE-DAY EXPERIMENT (The units are parts per billion (ppb) unless otherwise noted)

| Treatments | Day 1 (initial) | Day 4 (maximum) | Day 5 (final) |
|---|---|---|---|
| Carbon | | | |
| Reference | 11.6 a | 48.6 b | 44.7 b |
| 1 gm addition | 8.8 a | 98.9 c | 87.2 f |
| 6 gm addition | 8.9 a | 60.9 d | 57.5 d |
| 15 gm addition | 9.4 a | 32.8 e | 32.0 e |
| Nitrogen | | | |
| Reference | 0.90 a | 3.78 b | 3.47 b |
| 1 gm addition | 0.68 a | 7.68 c | 6.77 f |
| 6 gm addition | 0.69 a | 4.73 d | 4.46 d |
| 15 gm addition | 0.73 a | 2.55 e | 2.49 e |
| Potassium (ppb) | | | |
| Reference | 354 a | 1487 b | 1365 b |
| 1 gm addition | 268 a | 3205 c | 2666 f |
| 6 gm addition | 274 a | 1862 d | 1758 d |
| 15 gm addition | 289 a | 1004 e | 980 e |
| Phosphorous | | | |
| Reference | 190 a | 801 b | 736 b |
| 1 gm addition | 144 a | 1629 c | 1436 f |
| 3 gm addition | 148 a | 1002 d | 946 d |
| 15 gm addition | 155 a | 540 e | 543 e |
| Sulphur | | | |
| Reference | 54.4 a | 228.8 b | 210.2 b |
| 1 gm addition | 41.2 a | 465.4 c | 410.2 f |

TABLE 6-continued

IMMOBILIZED CARBON, NITROGEN, POTASSIUM, PHOSPHORUS, SULPHUR, MAGNESIUM, CALCIUM AND SODIUM IN MICROBIAL TISSUES AMONG TREATMENTS THROUGH THE FIVE-DAY EXPERIMENT (The units are parts per billion (ppb) unless otherwise noted)

| Treatments | Day 1 (initial) | Day 4 (maximum) | Day 5 (final) |
|---|---|---|---|
| 3 gm addition | 42.2 a | 286.4 d | 270.4 d |
| 15 gm addition | 44.4 a | 154.4 e | 150.8 e |
| Magnesium | | | |
| Reference | 38 a | 160 b | 147 b |
| 1 gm addition | 29 a | 326 c | 287 f |
| 3 gm addition | 30 a | 200 d | 189 d |
| 15 gm addition | 31 a | 108 e | 106 e |
| Calcium | | | |
| Reference | 248 a | 1041 b | 956 b |
| 1 gm addition | 187 a | 2118 c | 1866 f |
| 6 gm addition | 192 a | 1303 d | 1230 d |
| 15 gm addition | 202 a | 703 e | 686 e |
| Sodium | | | |
| Reference | 5.4 a | 22.9 b | 21.0 b |
| 1 gm addition | 4.1 a | 46.5 c | 41.0 f |
| 6 gm addition | 4.2 a | 28.6 d | 27.0 d |
| 15 gm addition | 4.4 a | 15.4 e | 15.1 e |

[a]Values with the same letter designation are not significantly different ($P \leq 0.05$) from each other.

TABLE 7

MICROBIAL CARBON TOTALS IN EXPERIMENTAL UNITS THROUGH THE 5-DAY EXPERIMENT (Units are milliliters (ml) of carbon).

| Treatments | Day 1 (initial) | Day 4 (maximum) | Day 5 (final) |
|---|---|---|---|
| Reference | 39.4 a | 165.2 b | 152.0 b |
| 1 gm addition | 29.9 a | 336.3 c | 296.5 f |
| 6 gm addition | 30.3 a | 207.1 d | 195.5 d |
| 15 gm addition | 32.0 a | 111.5 e | 108.8 e |

[a]Values with the same letter designation are not significantly different ($P \leq 0.05$) from each other.

Dissolved Organic Carbon (DOC) Analysis: Dissolved organic carbon (DOC) levels ranged from about 20 to 230 ppm (Table 8). DOC was highest at Day 1 and, in general, lowest at Day 3.

TABLE 8

TRENDS IN DISSOLVED ORGANIC CARBON (DOC) MEASUREMENTS (Units are mean parts per million (ppm))

| | 1 | 2 A.M. | 2 P.M. | 3 |
|---|---|---|---|---|
| Reference | 231 | 164 | 20 | 38 |
| 1 gm addition | 123 | 123 | 36 | 33 |
| 6 gm addition | 123 | 88 | 38 | 30 |
| 15 gm addition | 123 | 93 | 44 | 21 |

Percent Volatile Solids Analysis: Table 9 also shows that percent volatile solids ranged from 60 to 100. There was an average 13 percent decrease in volatile solids from Day 1 to Day 2. The largest change was observed in the 1 gm addition treatment with a decrease of −23 percent.

TABLE 9

TRENDS IN PERCENT VOLATILE SOLIDS AFTER MUFFLING OF OVEN-DRIED SOLIDS (Units are percentages).

PERCENT VOLATILE SOLIDS AFTER MUFFLING OF DRIED SOLIDS

| | | | |
|---|---|---|---|
| Reference | 97 | 86 | −11 |
| 1 gm addition | 100 | 77 | −23 |
| 6 gm addition | 76 | 60 | −16 |
| 15 gm addition | 66 | 62 | −4 |

I claim:

1. A biological degradation process for the treatment of organic-containing waste matter for producing a waste matter sludge material, the process containing a step for contacting microorganisms with the organic-containing waste matter, which comprises adding to the organic-containing waste matter a microbial activity and microbial population-enhancing concentration of a mineral composite consisting essentially of a naturally occurring glacial deposit comprising from about 4–48 wt. percent Si, 2–35 wt. percent Ca, 1–20 wt. percent Al, 1–15 wt. percent Fe, 0.5–12 wt. percent Mg, 0.1–8 wt. percent Na, 0.01–5 wt. percent K, 0.001–2 wt. percent Ti, 0.0005–2 wt. percent Mn, 0.0005–2 wt. percent P, 0.0005–1 wt. percent Ba and 0.0005–0.5 wt percent Zn, the mineral composite being in a biologically active size of below about 70% mesh size at 100 mesh, said concentration being below about 1 part by weight mineral composite per 15 parts by weight of organic matter contained in the waste matter to be treated and above about 1 part by weight mineral composite per 400 parts by weight of organic matter.

2. The process of claim 1 wherein the microbial activity and microbial population-enhancing concentration is below about 1 part by weight per 40 parts by weight of organic matter contained in the waste matter to be treated.

3. The process of claim 2 wherein the microbial activity and microbial population-enhancing concentration is about 1 part by weight per 120 parts by weight of organic matter contained in the waste matter to be treated.

4. The process of claim 1 wherein the biologically active size is below about 70% of mesh size at 200 mesh.

5. The process of claim 1 wherein the biological degradation process is an aerobic process.

6. The process of claim 1 wherein the biological degradation process is an anaerobic process.

7. The process of claim 1 wherein the organic-containing waste matter to be treated is selected from the group of municipal, domestic, industrial, agricultural, animal and organic debris waste matter.

8. The process of claim 1 wherein the dissolved organic carbon of the influent is substantially reduced.

9. The process of claim 1 wherein the organic-containing waste matter contains volatile solids and wherein the waste-matter sludge material contains from about 16–23% less volatile solids.

10. The process of claim 1 wherein the organic-containing waste matter has an aqueous content of up to about 99% by weight.

11. The process of claim 1 wherein microbial activity is carried out for a period of from about 6 hours to about 5 weeks.

* * * * *